United States Patent
Stern et al.

(10) Patent No.: US 12,292,813 B2
(45) Date of Patent: May 6, 2025

(54) METHOD AND SYSTEM FOR OPERATING A COMPUTER SIMULATION

(71) Applicant: Simudyne Ltd., London (GB)

(72) Inventors: Naomi Stern, London (GB); Krishnen Vytelingum, London (GB)

(73) Assignee: Simudyne, Ltd, London (GB)

( * ) Notice: Subject to any disclaimer, the term of this patent is extended or adjusted under 35 U.S.C. 154(b) by 444 days.

(21) Appl. No.: 16/422,048

(22) Filed: May 24, 2019

(65) Prior Publication Data

US 2020/0301807 A1   Sep. 24, 2020

Related U.S. Application Data

(60) Provisional application No. 62/819,985, filed on Mar. 18, 2019.

(51) Int. Cl.
| | |
|---|---|
| G06F 11/34 | (2006.01) |
| G06F 9/54 | (2006.01) |
| G06F 11/3698 | (2025.01) |
| G06Q 40/04 | (2012.01) |

(52) U.S. Cl.
CPC .......... *G06F 11/3457* (2013.01); *G06F 9/544* (2013.01); *G06F 9/546* (2013.01); *G06F 11/3698* (2025.01); *G06Q 40/04* (2013.01)

(58) Field of Classification Search
CPC ...... G06F 11/3457; G06F 9/544; G06F 9/546; G06F 11/3664; G06Q 40/04; G06Q 40/06
See application file for complete search history.

(56) References Cited

U.S. PATENT DOCUMENTS

| | | | | |
|---|---|---|---|---|
| 5,906,614 | A * | 5/1999 | Stern | A61B 18/1492 606/41 |
| 6,826,752 | B1 * | 11/2004 | Thornley | G06F 9/52 718/107 |
| 7,552,445 | B2 * | 6/2009 | Green | G06F 11/3072 709/224 |
| 10,133,575 | B2 | 11/2018 | Greiner et al. | |
| 10,415,605 | B1 * | 9/2019 | Benzschawel | F15B 7/001 |
| 10,873,457 | B1 * | 12/2020 | Beaudoin | H04L 9/3213 |
| 2002/0133325 | A1 * | 9/2002 | Hoare, II | G06F 30/20 703/17 |
| 2004/0254876 | A1 * | 12/2004 | Coval | G06Q 40/04 705/37 |
| 2006/0274659 | A1 * | 12/2006 | Ouderkirk | H04L 41/145 370/241 |

(Continued)

OTHER PUBLICATIONS

Moffit, "Learning Through Equity Trading Simulation", pp. 65-74. (Year: 2010).*

(Continued)

*Primary Examiner* — Kevin L Young
*Assistant Examiner* — Phuong N Hoang
(74) *Attorney, Agent, or Firm* — Ted Sabety; Sabety +associates, PLLC

(57) ABSTRACT

The disclosed method and system synchronizes information input into a simulation that is used to test a computer program in real time or simulated real time so that the program under test operates in an independent way. The method and system operates a timing protocol to connect one running computer process, a trading computer program, with another running process, a computer program that executes a market simulation.

9 Claims, 6 Drawing Sheets

(56) References Cited

U.S. PATENT DOCUMENTS

| | | | | |
|---|---|---|---|---|
| 2008/0228612 | A1* | 9/2008 | Schmidle | G06Q 40/02 705/35 |
| 2008/0243463 | A1* | 10/2008 | Lovas | G06Q 10/04 703/17 |
| 2008/0243572 | A1* | 10/2008 | Amos | G06Q 30/0201 705/7.29 |
| 2009/0006672 | A1* | 1/2009 | Blumrich | G06F 12/0831 710/54 |
| 2010/0274663 | A1 | 10/2010 | Hinton et al. | |
| 2012/0197617 | A1* | 8/2012 | Mujagic | G06F 30/331 703/7 |
| 2013/0297477 | A1 | 11/2013 | Overman et al. | |
| 2014/0223148 | A1 | 8/2014 | Inglett et al. | |
| 2015/0095368 | A1 | 4/2015 | Koppes et al. | |
| 2016/0078539 | A1* | 3/2016 | Ignatovich | G06Q 40/04 705/37 |
| 2016/0188761 | A1* | 6/2016 | Gil-Costa | G06F 30/20 703/17 |
| 2016/0224995 | A1* | 8/2016 | Brookfield | G06Q 40/04 |
| 2017/0344473 | A1* | 11/2017 | Gidra | G06F 12/0269 |
| 2018/0011697 | A1* | 1/2018 | Berkebile | G06Q 10/0631 |
| 2018/0047099 | A1* | 2/2018 | Bonig | G06Q 40/04 |
| 2018/0152289 | A1* | 5/2018 | Hunt | H04L 9/0637 |
| 2020/0012734 | A1 | 1/2020 | Lee et al. | |

OTHER PUBLICATIONS

11Blythe Jim et al: FARM: Architecture for Distributed Agent-Based Social Simulations 11, Jul. 14, 2018 (Jul. 14, 2018), Robocup 2008: Robocup 2008: Robot Soccer World Cup XI I ; [Lecture Notes in Computer Science; Lect.Notes Computer] , Springer-International Publishing, Cham, pp. 96107, XP047507862, ISBN: 978-3-319-10403-4 [retrieved on May 19, 2019] abstract—p. 3, paragraph 4 p. 4, paragraph 6• figure 1 p. 5, paragraph 2 p. 6, paragraph 1 p. 7, paragraph 1-p. 8, paragraph 2 p. 9, p. 4, p. 10, p. 2.

Donghui Lin et al: "Massively Multi-Agent Systems II", Massively Multi-Agent Systems II : International Workshop, MMAS 2018, Stockholm, Sweden, Jul. 14, 2018, Revised Selected Papers, Jul. 14, 2018 (Jul. 14, 2018), XP055686607, Cham ISBN: 978-3-030-20937-7 Retrieved from the Internet: URL:http://link.springer.com/content/pdf/10.1007/978-3-030-20937-7.pdf [retrieved on Apr. 16, 2020] pp. 103-114.

IBM "IBM System Blue Gene/Q", Nov. 30, 2011 pp. 1-6 ZPO55689358. http://www.fz-juelich.de/sharedocs/downloads/ias/jsc/en/juqueen/bgqibmdatasheet.pdf?_blob=publicationfile . Retried Apr. 27, 2020.

Marquez Claudio et al: "Graph-Based Automatic Dynamic Load Balancing for HPC Agent-Based Simulations", Dec. 18, 2015 (Dec. 18, 2015), International Conference on Financial Cryptography and Data Security; [Lecture Notes in Computer Science; Lect.Notes Computer], Springer, Berlin, Heidelberg, pp. 405-416, XP047344710, ISBN: 978-3-642-17318-9 [retrieved on Dec. 18, 2015] abstract pp. 3-7.

* cited by examiner

METHOD AND SYSTEM FOR OPERATING A COMPUTER SIMULATION

PRIORITY CLAIM

This is a utility patent application which claims the benefit of U.S. Provisional Patent Application No. 62/819,985 filed on Mar. 18, 2019 which is hereby incorporated by reference in its entirety for all that it teaches.

FIELD OF INVENTION

This relates to testing external computer processes that interact with computer simulations.

BACKGROUND

The use of computer simulations of real-world phenomenon has been described in U.S. Pat. App. No. 62/802,105, filed on Feb. 6, 2019, U.S. Pat. App. No. 62/812,739 filed on Mar. 1, 2019 and U.S. patent application Ser. No. 16/386,834 filed on Apr. 17, 2019 all of which are incorporated herein by reference. In one embodiment, a computer simulation may simulate a market, including an electronically operated market, for example, a modern securities market. In some situations, market participants use computer systems to operate computer programs to automatically buy and sell securities, or other financial instruments, whereby the computer program makes decisions to buy and sell the security based on prevailing buying and selling prices and other parameters, and automatically formats buy and sell order data messages that are then transmitted to the appropriate electronic market participants. Of course, the operators of such computer programs have to have authorization with a securities market in order to have such orders executed, and with such authorization comes the risk that the computer program actually loses money. For this reason, there is a need to operate the computer program that is performing the trading with a simulation of a securities market in order to evaluate the performance of the computer program. See FIG. 1. In its simplest form, the trading program (101) receives bid/ask/price ticks from the simulation (102) and acting on that data, delivers trading instructions back into the simulation (102). Preferably, this test can be accomplished at a rate that is faster than actual real-time in order to evaluate the trading computer program over the course of many trading sessions.

SUMMARY

The invention involves the protocol to connect one running computer process, the trading computer program, with another running process, the computer program that executes a market simulation. In this situation, data messages representing bids, asks, and ticks would go back and forth between the two processes. Note that the two processes could be executing on two different computer systems connected by a data network, or could be operating on the same computer system. The fundamental problem solved by the invention is how to operate inter-process communication between them in order to optimize the quality and speed of the simulation and testing of the external computer program, for example, a securities trading software tool. The invention converts asynchronous trading order data generated by a trading program that interacts with the simulation, into synchronous data that corresponds to a series of time steps in order that the market simulation be able to cycle its calculations for each time step.

In this way, the combination of the external trading program being tested and the market simulation occupies a place between event driven simulation and simulation calculated in discrete time steps.

DESCRIPTION OF THE FIGURES

The headings provided herein are for convenience only and do not necessarily affect the scope or meaning of the claimed invention. In the drawings, the same reference numbers and any acronyms identify elements or acts with the same or similar structure or functionality for ease of understanding and convenience. To easily identify the discussion of any particular element or act, the most significant digit or digits in a reference number refer to the Figure number in which that element is first introduced (e.g., element 204 is first introduced and discussed with respect to FIG. 2).

DETAILED DESCRIPTION

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other features not described in detail herein. Additionally, some well-known structures or functions may not be shown or described in detail below, so as to avoid unnecessarily obscuring the relevant description. The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

The first problem the invention addresses is how the two processes can be synchronized. The market simulation has a time step, delta-t, that might be a millisecond, and the trading algorithm may simply respond to data coming in from the market simulation, such that each delta-t corresponds to a real time in milliseconds. The notion is that the market simulation process calculates for a state vector at time t, a state vector for the market for time t+delta-t using that state vector at time t plus all inputs at time step t. The state vector can be viewed as the current bid-asks for all the securities in the market. The inputs can be considered the incoming trading instructions arising from that state vector.

In one embodiment, both the trading process and the market simulation run in actual real-time. In this embodiment, the overall simulation and test operates at the actual normal time rate. In other words, it would take 8 hours to simulate an 8 hour trading day.

Figure 1:
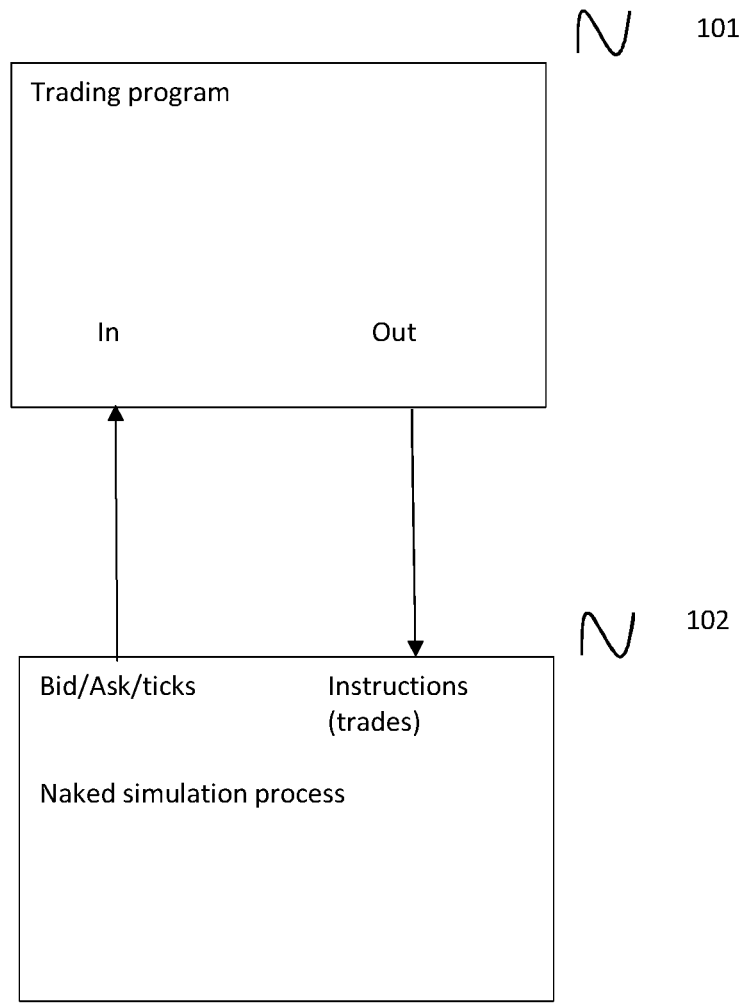
FIG. 1: Basic Block Diagram relating a Trading Process to a Market Simulation Process
Figure 2:
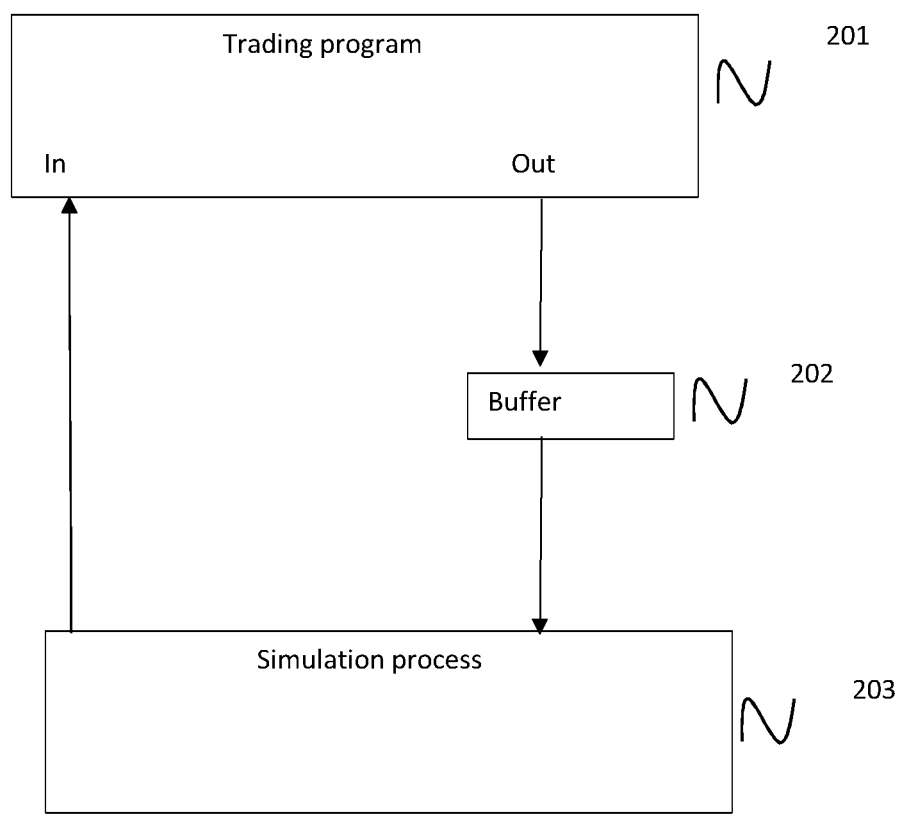
FIG. 2: Block Diagram showing asynchronous operation using a buffer for simulation process inputs.

In this embodiment, the simulation process runs on its own schedule asynchronously to the trading program (201) under test. In this embodiment, the trading inputs that the market simulation process (203) receives are buffered (202) along with all of the other simulated trader inputs. Those buffered inputs are then used to calculate the next time step of the simulation. (See FIG. 2). In this embodiment, the market simulation process output is not buffered for the trading program because the trading algorithm is supposed to operate in actual real time. However, the simulation process has to buffer the incoming trading input commands for a time step, along with simulated trader commands that are stored as part of the input for the next time step, and then execute the simulation calculation for the next time step.

Figure 3:
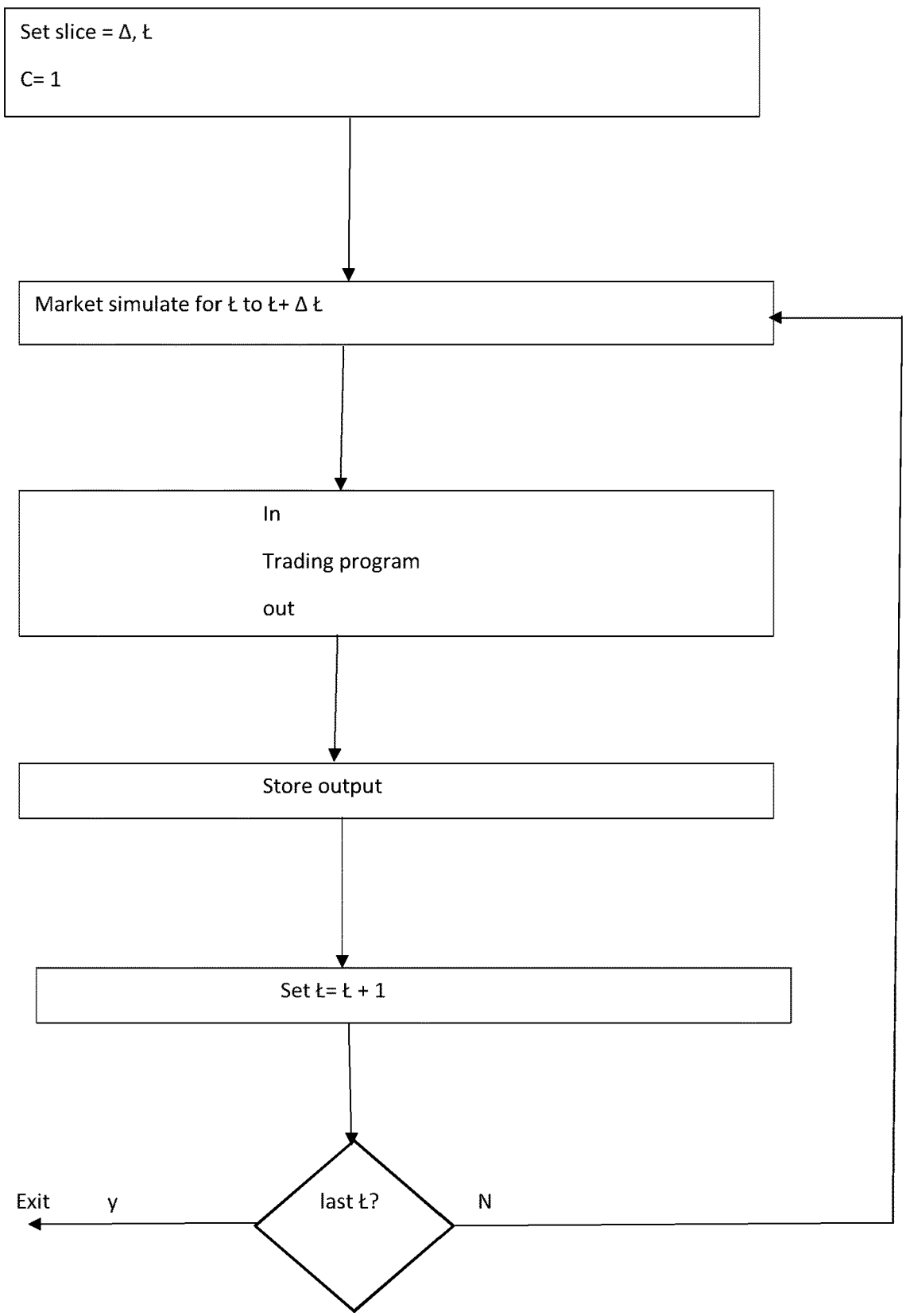
FIG. 3: Flow Chart for asynchronous operation of the trading process with the simulation process.

In other words, the market simulation process (203) buffered the external trading command data stream from the trading program under test (202) in order that it be synced with the next time step executed within the market simulation. When the simulation process finishes the time step, it sends its output to the trading algorithm right away, without a buffer, and not waiting on a response. See FIG. 3.

Figure 4:
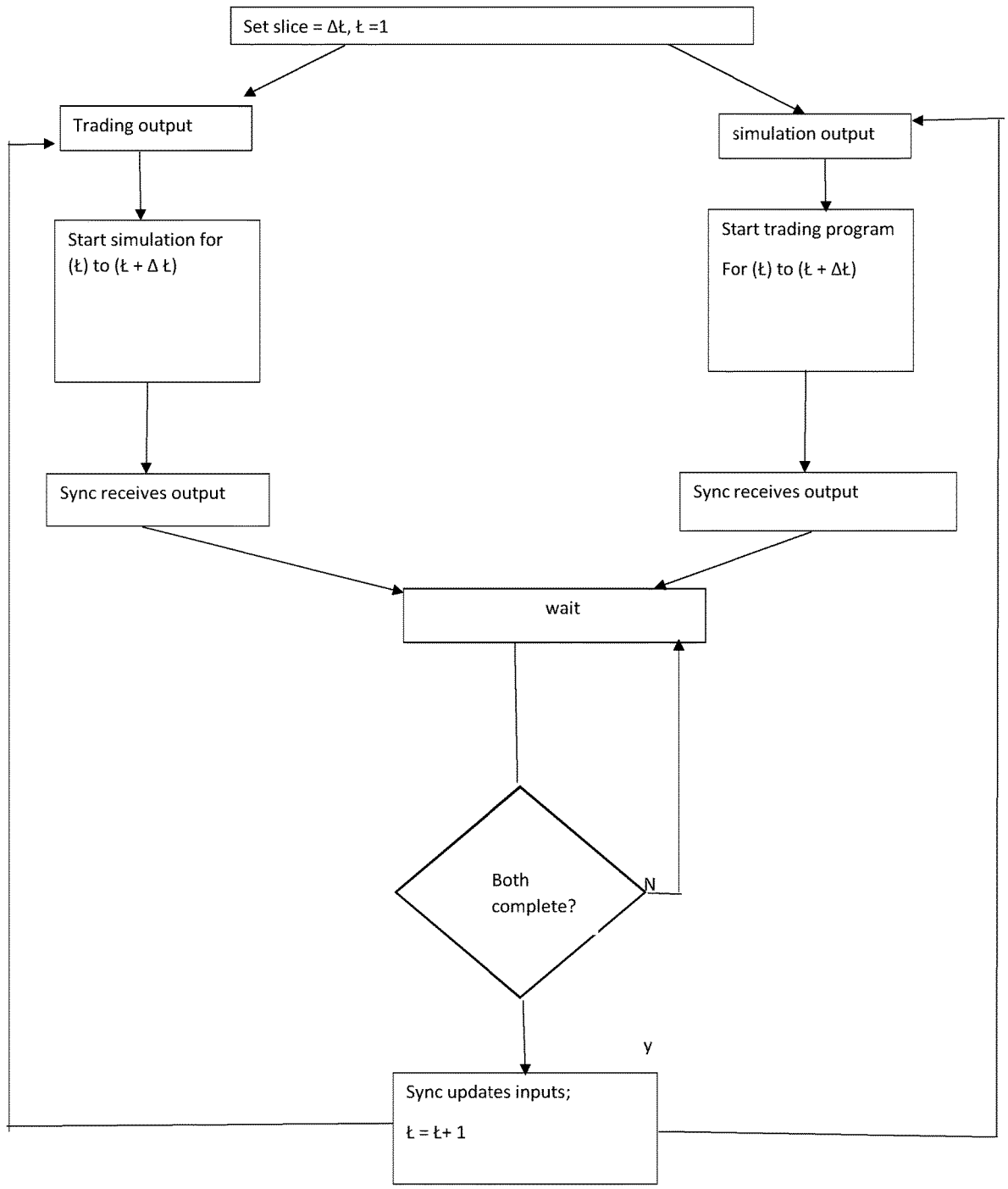
FIG. 4: Flow Chart showing use of wait states to synchronize simulation process with trading process using sync process.

In another embodiment, the two processes will operate faster than actual real-time. In this situation the simulation of a trading day may take a matter of minutes or seconds. By "real time" in this case, we mean that the trading algorithm can run without a timing handshake with the simulation or vice versa, that is both can rely on an external "real time" clock (which could faster than real time in order to compress the simulation solution to faster determination.) In another embodiment, there is a synchronization, an external clock that tells the simulation what time it is and also tells the trading program that the next time step (predetermined in length) is underway, then both processes run as fast as possible, but each waits for the external service to confirm that the other process has completed that time step, and then both processes and the external service broadcasts that both processes can move to the next time step. See FIG. 4.

In yet another embodiment, there are three processes:
Simulation process transmits to the sync process and trading program, simulation data from last time step and to start next time step;
Trading program transmits to sync process and simulation process the trading output of last time step and to start next time step;
Sync process Waits on trading algorithm to confirm completion of that time step;
If so
Sync process Waits on simulation algorithm to confirm completion of that time step;
If so, got to the top and repeat.

In this embodiment, the delta-t time step amount is set to be sufficiently short so that only a few events have to be exchanged between the trading program and the simulation for each time step. When running, there is data input that corresponds to the n-th time step, and that gets processed and the simulation then waits until the synchronizer says move to the next step. Nonetheless, the defined width of time step, that is, the granularity of the market simulation in terms of time, is preferably short enough that for each time step, only a few, and preferably only one event is exchanged between the trading program and the market simulation.

Note that the width of the time step is arbitrary relative to real time: it could be 1 millisecond of data, but if it is executed within a microsecond, that is a time compression of 1000 times. This permits the trading program under test to be tested for an 8 hour trading day in less than a minute. So the definition of the simulated series of time steps is not dependent on the computer clock time at all. But if delta t is short enough the results appear as if it were in real time, but compressed.

In yet another embodiment, the sync process acts as a data transceiver between the trading program and the market simulation process. The synch process buffers data output from the trading program in order that the market simulation receive it when it completes the current time step. In other words, until the simulation process has completed time step t, the sync process stores the trading program output that the market simulation will use for time step t+1. When the market simulation announces that it has completed time step t, it can fetch from the sync process (or the locations it has stored the data) the next trading input data for time step t+1. This way, the trading program does not have to be re-written to buffer its output and incorporate a handshake with the simulation program. In this embodiment, both processes have to tell the synchronizer process when it is done and waiting. See FIG. 4.

In yet another embodiment, the simulation process is comprised of an input buffer for the next time step. In this embodiment, the trading program writes output into that buffer, but the market simulation process waits for a synchronization signal from the sync process before using that buffered data for the next time step.

Figure 5:
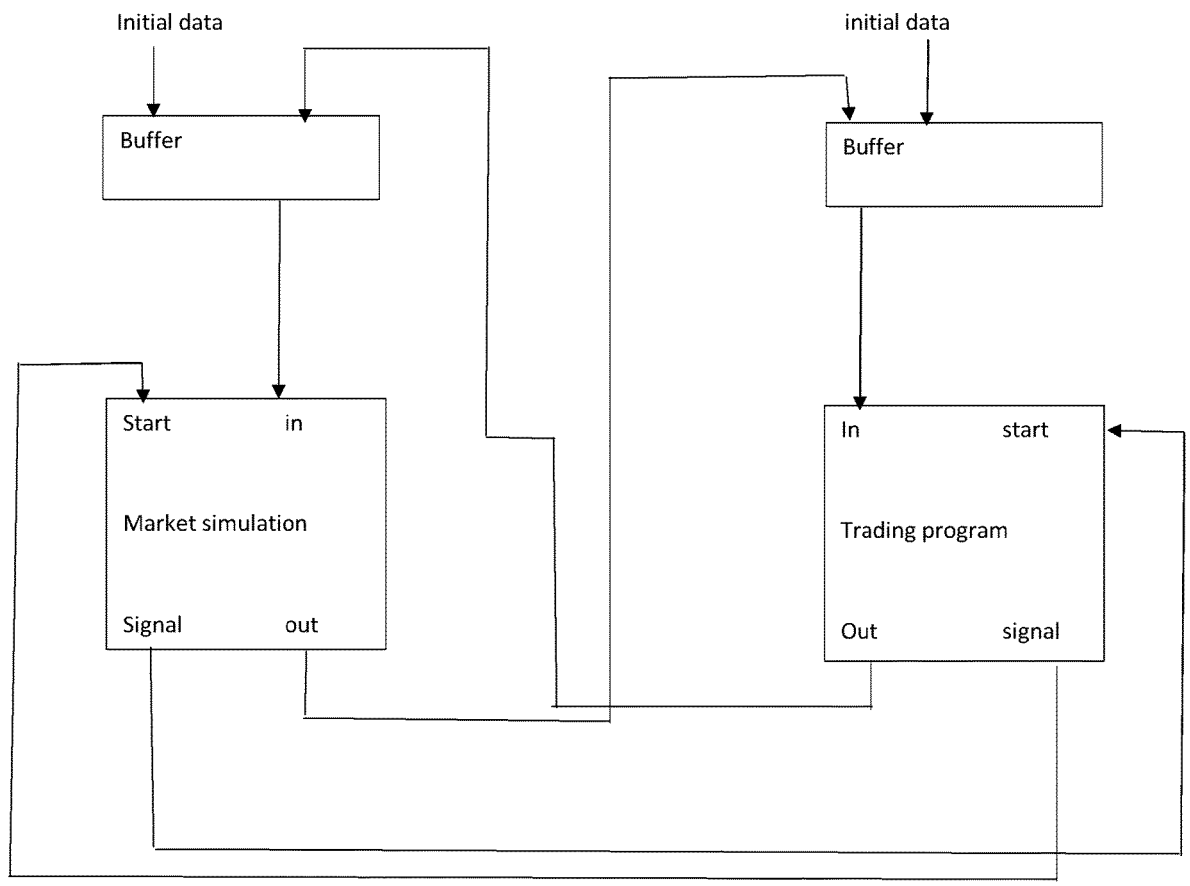
FIG. 5: Block diagram showing data flows of simulation process and trading process using mutual completion signals to start next time step.
Figure 6:
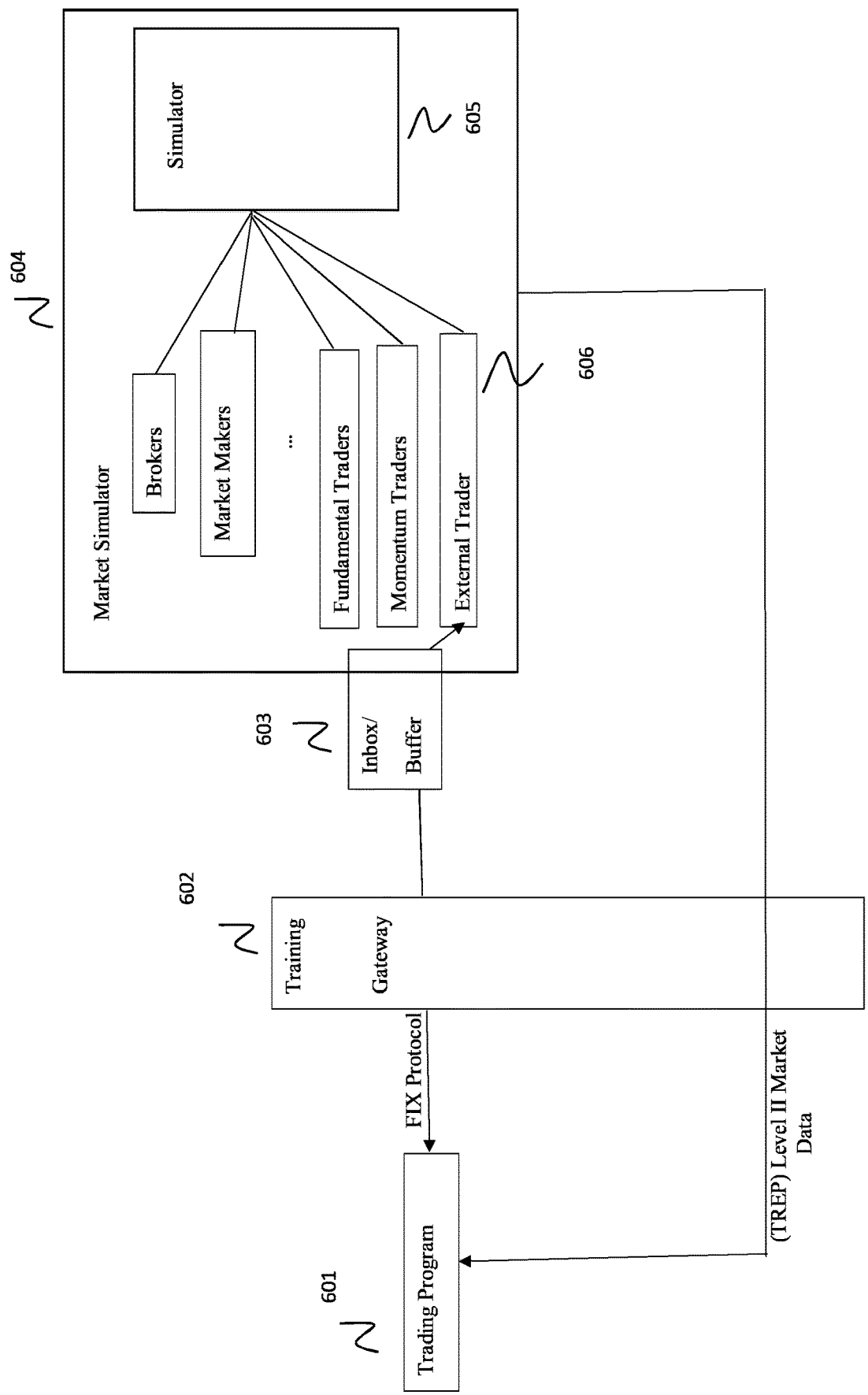
FIG. 6: Basic arrangement of the external trading program, gateway, buffer and simulation engine.

In yet another embodiment, the two processes can buffer their respective input data and wait on processing it until it has received from the other processes a signal that it has completed the current time step. In this embodiment, the operation of the sync process is integrated into the trading program process and the market simulation process. However this may require a re-write of the trading program under test. See FIG. 5. In this embodiment, time compression may not operate as intended.

In yet another embodiment, a process may buffer the communications and thereby synchronize the external trading program and the agent simulation. In this embodiment, the trading program under test (601) interacts through a training gateway (602) with the market simulation (604). The order information enters the simulation through the inbox buffer (603). A simulated trader process (606) retrieves orders from the buffer (603) and then submits them to the exchange simulation engine (605). The output of the simulation may be transmitted by the FIX or Level II Market protocols to the trading program (601).

This is further described by the following pseudo-code:

---

Algorithm 1:

---

For i = 0 to N do:
    // Traders send order messages to Exchanges.
    $Q_0$ = null;
    For all j ∈ M do:
//Trader j may submit a request to submit a new, or modify or cancel an order o, at time $t_j$
    $Q_0 = Q_0 \cup \{u\}$;

-continued

Algorithm 1:

```
End For
// Buffering of external trading program trader i's order o may occur at this point in the process.
// Each exchange in the simulation handles or executes order messages received from traders:
    Q_E = null;
    For all o ∈ Q_0 do:
    Exchange clears order o against its orderbooks;
    Exchange reports a set of executions, E to the traders for each queued, replaced,
    cancelled, partially filled or filled orders
    Q_E = Q_E U E;
    Exchange reports trades and ticks to traders, r,
    Q_E = Q_E U r;
    End For
    //Each trader handles execution reports received from exchanges:
    For all r ∈ Q_E do:
    Trader j (target of Report r) updates its internal state given r;
    End For
End For
```

Algorithm 1 is what happens in the market simulation platform, so its all happening in step Ti. For the external trading program being tested, time is not Ti, its Ti−1. That is because at time step N inside the simulation, the inputs are everything that has arrived by time step N−1. In this pseudo code, M is the set of all traders, external or simulated. This buffer is within the simulation engine, and referred to as an inbox. In this embodiment, all simulated trader and exchange outputs may also be buffered in order to synchronize them the market simulation.

The buffer is a data structure that is designed so that when an order is submitted from the external trading program, it is retained in the buffer until fetched by a trader process for simulation of the next time step. So the simulation modules or agents that execute or respond to the trading program trade orders, looks at the buffer for time step i at any time during that time step. Then, at the end of the time step, all the order are sent to the simulator for calculating the next step in the simulation. In this way, the external trading program submits orders into the buffer, which buffers the trader submissions until they are used for calculating the next time step.

In some embodiments, there may be a race condition where the external trading program may issue a new order, but the cycling of the simulation input process is such that the simulation input has already polled the buffer and thereby missed the new order, so it sits in the buffer until the next time step. To alleviate this, the time step period may be reduced. There is a floor delta t below which the simulation cannot complete the behavior of the enter set agents within that time period due to the number of calculations. For example, the time step must be as long as the shortest latency trader process in the simulation. In the other embodiments, with the time step set, there is a race condition, but the simulation can be accelerated in simulated time.

In yet another embodiment, the time step can be varied dynamically based on the rate of incoming events. The time step delta between steps i and i+1 can be calculated as a function of the number of events in the buffer. Alternatively, as the buffer fills up to a predetermined threshold, the time period can be automatically set to end in order that the buffered order messages get passed into the simulation to calculate the output for the next time step. Essentially the busier the events, the shorter the time step. In yet another embodiment, each time a trading program submits a new event or trading order, the next time step in initiated. When the simulation finished calculating that step and new pricing values are broadcast back, that is the expiration of that time step. That is, each event input perturbs system, and thereby starts time step. When system converges on a new steady state, the time step ends.

Operating Environment:

The system is typically comprised of a central server that is connected by a data network to a user's computer. The central server may be comprised of one or more computers connected to one or more mass storage devices. The precise architecture of the central server does not limit the claimed invention. Further, the user's computer may be a laptop or desktop type of personal computer. It can also be a cell phone, smart phone or other handheld device, including a tablet. The precise form factor of the user's computer does not limit the claimed invention. Examples of well-known computing systems, environments, and/or configurations that may be suitable for use with the invention include, but are not limited to, personal computers, server computers, handheld computers, laptop or mobile computer or communications devices such as cell phones, smart phones, and PDA's, multiprocessor systems, microprocessor-based systems, set top boxes, programmable consumer electronics, network PCs, minicomputers, mainframe computers, distributed computing environments that include any of the above systems or devices, and the like. Indeed, the terms "computer," "server," and the like may be used interchangeably herein, and may refer to any of the above devices and systems.

The user environment may be housed in the central server or operatively connected to it. In one embodiment, the user's computer is omitted, and instead an equivalent computing functionality is provided that works on a server. In this case, a user would log into the server from another computer and access the system through a user environment, and thereby access the functionality that would in other embodiments, operate on the user's computer. Further, the user may receive from and transmit data to the central server by means of the Internet, whereby the user accesses an account using an Internet web-browser and browser displays an interactive web page operatively connected to the central server. The server transmits and receives data in response to data and commands transmitted from the browser in response to the customer's actuation of the browser user interface. Some steps of the invention may be performed on the user's computer and interim results transmitted to a server. These interim results may be processed at the server and final results passed back to the user.

The Internet is a computer network that permits customers operating a personal computer to interact with computer servers located remotely and to view content that is delivered from the servers to the personal computer as data files over the network. In one kind of protocol, the servers present webpages that are rendered on the customer's personal computer using a local program known as a browser. The browser receives one or more data files from the server that are displayed on the customer's personal computer screen. The browser seeks those data files from a specific address, which is represented by an alphanumeric string called a Universal Resource Locator (URL). However, the webpage may contain components that are downloaded from a variety of URL's or IP addresses. A website is a collection of related URL's, typically all sharing the same root address or under the control of some entity. In one embodiment different regions of the simulated space displayed by the browser have different URL's. That is, the webpage encoding the simulated space can be a unitary data structure, but different URL's reference different locations in the data structure. The user computer can operate a program that receives from a remote server a data file that is passed to a program that interprets the data in the data file and commands the display device to present particular text, images, video, audio and other objects. In some embodiments, the remote server delivers a data file that is comprised of computer code that the browser program interprets, for example, scripts. The program can detect the relative location of the cursor when the mouse button is actuated, and interpret a command to be executed based on location on the indicated relative location on the display when the button was pressed. The data file may be an HTML document, the program a web-browser program and the command a hyper-link that causes the browser to request a new HTML document from another remote data network address location. The HTML can also have references that result in other code modules being called up and executed, for example, Flash or other native code.

The invention may also be entirely executed on one or more servers. A server may be a computer comprised of a central processing unit with a mass storage device and a network connection. In addition a server can include multiple of such computers connected together with a data network or other data transfer connection, or, multiple computers on a network with network accessed storage, in a manner that provides such functionality as a group. Practitioners of ordinary skill will recognize that functions that are accomplished on one server may be partitioned and accomplished on multiple servers that are operatively connected by a computer network by means of appropriate inter process communication. In addition, the access of the website can be by means of an Internet browser accessing a secure or public page or by means of a client program running on a local computer that is connected over a computer network to the server. A data message and data upload or download can be delivered over the Internet using typical protocols, including TCP/IP, HTTP, TCP, UDP, SMTP, RPC, FTP or other kinds of data communication protocols that permit processes running on two respective remote computers to exchange information by means of digital network communication. As a result a data message can be one or more data packets transmitted from or received by a computer containing a destination network address, a destination process or application identifier, and data values that can be parsed at the destination computer located at the destination network address by the destination application in order that the relevant data values are extracted and used by the destination application. The precise architecture of the central server does not limit the claimed invention. In addition, the data network may operate with several levels, such that the user's computer is connected through a fire wall to one server, which routes communications to another server that executes the disclosed methods.

The invention may also be practiced in distributed computing environments where tasks are performed by remote processing devices that are linked through a communications network. In a distributed computing environment, program modules may be located in both local and remote computer storage media including memory storage devices. Practitioners of ordinary skill will recognize that the invention may be executed on one or more computer processors that are linked using a data network, including, for example, the Internet. In another embodiment, different steps of the process can be executed by one or more computers and storage devices geographically separated by connected by a data network in a manner so that they operate together to execute the process steps. In one embodiment, a user's computer can run an application that causes the user's computer to transmit a stream of one or more data packets across a data network to a second computer, referred to here as a server. The server, in turn, may be connected to one or more mass data storage devices where the database is stored. The server can execute a program that receives the transmitted packet and interpret the transmitted data packets in order to extract database query information. The server can then execute the remaining steps of the invention by means of accessing the mass storage devices to derive the desired result of the query. Alternatively, the server can transmit the query information to another computer that is connected to the mass storage devices, and that computer can execute the invention to derive the desired result. The result can then be transmitted back to the user's computer by means of another stream of one or more data packets appropriately addressed to the user's computer. In one embodiment, a relational database may be housed in one or more operatively connected servers operatively connected to computer memory, for example, disk drives. In yet another embodiment, the initialization of the relational database may be prepared on the set of servers and the interaction with the user's computer occur at a different place in the overall process.

The method described herein can be executed on a computer system, generally comprised of a central processing unit (CPU) that is operatively connected to a memory device, data input and output circuitry (IO) and computer data network communication circuitry. Computer code executed by the CPU can take data received by the data communication circuitry and store it in the memory device. In addition, the CPU can take data from the I/O circuitry and store it in the memory device. Further, the CPU can take data from a memory device and output it through the IO circuitry or the data communication circuitry. The data stored in memory may be further recalled from the memory device, further processed or modified by the CPU in the manner described herein and restored in the same memory device or a different memory device operatively connected to the CPU including by means of the data network circuitry. The CPU may perform logic comparisons of one or more of the data items stored in memory or in the cache memory of the CPU, or perform arithmetic operations on the data in order to make selections or determinations using such logical tests or arithmetic operations. The process flow may be altered as a result of such logical tests or arithmetic operations so as to select or determine the next step of a process. The CPU may change an addressing pointer for the next instruction to execute based on the result of such a logical test and thereby perform the change in process flow dependent on the determined logical state. The memory device can be any kind of data storage circuit or magnetic storage or optical device, including a hard disk, optical disk or solid state memory. The IO devices can include a display screen, loudspeakers, microphone and a movable mouse that indicate to the computer the relative location of a cursor position on the display and one or more buttons that can be actuated to indicate a command.

The computer can display on the display screen operatively connected to the I/O circuitry the appearance of a user interface. Various shapes, text and other graphical forms are displayed on the screen as a result of the computer generating data that causes the pixels comprising the display screen to take on various colors and shades or brightness. The user interface may also display a graphical object referred to in the art as a cursor. The object's location on the display indicates to the user a selection of another object on the screen. The cursor may be moved by the user by means of another device connected by I/O circuitry to the computer. This device detects certain physical motions of the user, for example, the position of the hand on a flat surface or the position of a finger on a flat surface. Such devices may be referred to in the art as a mouse or a track pad. In some embodiments, the display screen itself can act as a trackpad by sensing the presence and position of one or more fingers on the surface of the display screen. When the cursor is located over a graphical object that appears to be a button or switch, the user can actuate the button or switch by engaging a physical switch on the mouse or trackpad or computer device or tapping the trackpad or touch sensitive display. When the computer detects that the physical switch has been engaged (or that the tapping of the track pad or touch sensitive screen has occurred), it takes the apparent location of the cursor (or in the case of a touch sensitive screen, the detected position of the finger) on the screen and executes the process associated with that location. As an example, not intended to limit the breadth of the disclosed invention, a graphical object that appears to be a two dimensional box with the word "enter" within it may be displayed on the screen. If the computer detects that the switch has been engaged while the cursor location (or finger location for a touch sensitive screen) was within the boundaries of a graphical object, for example, the displayed box, the computer will execute the process associated with the "enter" command. In this way, graphical objects on the screen create a user interface that permits the user to control the processes operating on the computer.

In some instances, especially where the user computer is a mobile computing device used to access data through the network the network may be any type of cellular, IP-based or converged telecommunications network, including but not limited to Global System for Mobile Communications (GSM), Time Division Multiple Access (TDMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), Worldwide Interoperability for Microwave Access (WiMAX), Universal Mobile Telecommunications System (UMTS), Evolution-Data Optimized (EVDO), Long Term Evolution (LTE), Ultra Mobile Broadband (UMB), Voice over Internet Protocol (VoIP), Unlicensed Mobile Access (UMA), any form of 802.11.xx or Bluetooth.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as C, C++, C #, Action Script, PHP, EcmaScript, JavaScript, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The invention may be described in the general context of computer-executable instructions, such as program modules, being executed by a computer. Generally, program modules include routines, programs, objects, binary components that, when executed by the CPU, perform particular tasks or implement particular abstract data types and when running, may generate in computer memory or store on disk, various data structures. A data structure may be represented in the disclosure as a manner of organizing data, but is implemented by storing data values in computer memory in an organized way. Data structures may be comprised of nodes, each of which may be comprised of one or more computer memory locations into which is stored one or more corresponding data values that are related to an item being represented by the node in the data structure. The collection of nodes may be organized in various ways, including by having one node in the data structure being comprised of a memory location wherein is stored the memory address value or other reference, or pointer, to another node in the same data structure. By means of the pointers, the relationship by and among the nodes in the data structure may be organized in a variety of topologies or forms, including, without limitation, lists, linked lists, trees and more generally, graphs. The relationship between nodes may be denoted in the specification by a line or arrow from a designated item or node to another designated item or node. A data structure may be stored on a mass storage device in the form of data records comprising a database, or as a flat, parsable file. The processes may load the flat file, parse it, and as a result of parsing the file, construct the respective data structure in memory. In other embodiment, the data structure is one or more relational tables stored on the mass storage device and organized as a relational database.

The computer program and data may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed hard disk), an optical memory device (e.g., a CD-ROM or DVD), a PC card (e.g., PCMCIA card, SD Card), or other memory device, for example a USB key. The computer program and data may be fixed in any form in a signal that is transmittable to a computer using any of various communication technologies, including, but in no way limited to, analog technologies, digital technologies, optical technologies, wireless technologies, networking technologies, and internetworking technologies. The computer program and data may be distributed in any form as a removable storage medium with accompanying printed or electronic documentation (e.g., a disk in the form of shrink wrapped software product or a magnetic tape), preloaded with a computer system (e.g., on system ROM or fixed disk), or distributed from a server, website or electronic bulletin board or other communication system (e.g., the Internet or World Wide Web.) It is appreciated that any of the software components of the present invention may, if desired, be implemented in ROM (read-only memory) form. The software components may, generally, be implemented in hardware, if desired, using conventional techniques.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention. Where the disclosure refers to matching or comparisons of numbers, values, or their calculation, these may be implemented by program logic by storing the data values in computer memory and the program logic fetching the stored data values in order to process them in the CPU in accordance with the specified logical process so as to execute the matching, comparison or calculation and storing the result back into computer memory or otherwise branching into another part of the program logic in dependence on such logical process result. The locations of the stored data or values may be organized in the form of a data structure. The logic described herein may be expressed by computer code that is performed by the computers comprising the system when that code is executed by the computer system. For example, where the disclosure recites a determination or validation whether a condition exists, this may be accomplished by the computer code including a conditional branching statement using a Boolean logical condition, and then that statement resulting in alternative process steps being executed based on the data representation of the condition being determined or validated. In other embodiments, where the disclosure recites a determination, it may be that the computer executes program steps that run a calculation using data representing input state conditions in order to calculate data as a result that represents such a determined result. Similarly, when the invention is described as executing a selection, that may be by the computer system executing code that repeatedly loops on a Boolean logical condition of matching one data value against a set of other data values until a matching data value is found.

The described embodiments of the invention are intended to be exemplary and numerous variations and modifications will be apparent to those skilled in the art. All such variations and modifications are intended to be within the scope of the present invention as defined in the appended claims. Although the present invention has been described and illustrated in detail, it is to be clearly understood that the same is by way of illustration and example only, and is not to be taken by way of limitation. It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable combination. It is appreciated that the particular embodiment described in the Appendices is intended only to provide an extremely detailed disclosure of the present invention and is not intended to be limiting.

The foregoing description discloses only exemplary embodiments of the invention. Modifications of the above disclosed apparatus and methods which fall within the scope of the invention will be readily apparent to those of ordinary skill in the art. Accordingly, while the present invention has been disclosed in connection with exemplary embodiments thereof, it should be understood that other embodiments may fall within the spirit and scope of the invention as defined by the following claims.

What is claimed:

1. A computer system for testing an external computer program process interacting with an agent based simulation process across a data network comprising:
   computer memory comprised of program data that when executed causes the system to receive from the data network at least one trading instruction order data messages from the external program process and to store the received at least one trading instruction order data messages in a data buffer said data buffer corresponding to a next time step;
   computer memory comprised of program data that when executed causes the system to synchronize by determining that the agent based simulation process has completed simulating a current time step and in dependence thereon, incrementing a data value representing the current time step to the next time step;
   computer memory comprised of program data that when executed causes the system to broadcast using the data network a result data of the completed agent based simulation of the current time step to the external program process; and
   computer memory comprised of program data that when executed causes the system to transmit the trading order data messages stored in the data buffer to the agent based simulation process in order that the agent based simulation process calculate its output for the next time step.

2. The system of claim 1 where the agent simulation process operates asynchronously to the external computer program process.

3. The system of claim 1 further comprising:
   computer memory comprised of program data that when executed causes the system to provide a time step signal corresponding to a time step to the external program process and the agent based simulation process, where the agent based simulation process is further adapted to complete the time step referenced by the time step signal and then transmit a message to a time step module in response to the completion of the referenced time step.

4. The system of claim 2 further comprising:
   computer memory comprised of program data that further causes the system to determine that the agent based simulation process has entered a steady state.

5. The system of claim 3 further comprising:
   computer memory comprised of program data that further causes the system to increment the time step signal upon determining a logical condition that the agent based simulation process has completed processing the current time step.

6. The system of claim 3 further comprising computer memory comprised of program data that when executed causes the system to modify a period of time corresponding to the time step in dependence on the number of trading order data messages stored in the data buffer.

7. The system of claim 3 where a length of the time step signal is as long as a shortest latency period corresponding to a set of trader processes comprising the agent based simulation process.

8. The system of claim 3 where a width of the time step signal encompasses a single order event in the data buffer.

9. The system of claim 3 where an actual time to execute the time step is less than a corresponding simulated width of the time step.

* * * * *